(12) United States Patent
Hawley

(10) Patent No.: US 12,384,394 B2
(45) Date of Patent: Aug. 12, 2025

(54) PEDAL SMOOTHING SYSTEMS AND METHODS

(71) Applicant: Toyota Motor Engineering & Manufacturing North America, Inc., Plano, TX (US)

(72) Inventor: Thomas S. Hawley, Ann Arbor, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 541 days.

(21) Appl. No.: 17/592,600

(22) Filed: Feb. 4, 2022

(65) Prior Publication Data

US 2023/0249704 A1    Aug. 10, 2023

(51) Int. Cl.
*B60W 50/12* (2012.01)
*B60W 30/02* (2012.01)
(Continued)

(52) U.S. Cl.
CPC ............ *B60W 50/12* (2013.01); *B60W 30/02* (2013.01); *B60W 30/18009* (2013.01);
(Continued)

(58) Field of Classification Search
CPC .................. B60W 50/12; B60W 30/02; B60W 30/18009; B60W 50/10; B60W 2420/403;
(Continued)

(56) References Cited

U.S. PATENT DOCUMENTS

| 2017/0030270 A1* | 2/2017 | Tipton ................... F02D 11/02 |
| 2021/0281101 A1 | 9/2021 | Lee et al. |
| 2022/0266829 A1* | 8/2022 | Thompson .......... B60W 50/087 |

FOREIGN PATENT DOCUMENTS

| DE | 102016011175 A1 | 3/2017 |
| EP | 2604463 B1 | 6/2016 |

(Continued)

OTHER PUBLICATIONS estore.com "ASM330LHHTR Automotive 6-axis inertial module: 3D accelerometer and 3D gyroscope", 2021, estore.com (Year: 2021).*

(Continued)

*Primary Examiner* — Aniss Chad
*Assistant Examiner* — Chase L Cooley
(74) *Attorney, Agent, or Firm* — HAYNES AND BOONE, LLP

(57) ABSTRACT

Systems and methods for smoothing accelerator signal oscillations caused by road interference are provided. The disclosed systems and methods may apply a pedal smoothing logic/filter to avoid unnecessary torque request oscillation (e.g., torque hunting) caused by pedal oscillation. For example, a control may determine when outside road inputs are causing the driver to oscillate the pedal. When road interference is occurring, the pedal smoothing logic/filter is activated to limit torque request oscillation. When road interference is minimal or non-existent, the pedal smoothing logic/filter is deactivated to maintain vehicle responsiveness for intended driver inputs. A method may include determining a shock value based on a vehicle acceleration, comparing the shock value to a threshold value, and activating a pedal smoothing logic to smooth an accelerator signal based on the shock value being greater than the threshold value. A system may be configured to perform the disclosed method(s).

17 Claims, 6 Drawing Sheets

(51) Int. Cl.
*B60W 30/18* (2012.01)
*B60W 50/10* (2012.01)
(52) U.S. Cl.
CPC ....... *B60W 50/10* (2013.01); *B60W 2420/403* (2013.01); *B60W 2510/0657* (2013.01); *B60W 2552/35* (2020.02)
(58) Field of Classification Search
CPC ..... B60W 2510/0657; B60W 2552/35; B60W 40/06; B60W 2050/0051; B60W 2050/0052; B60W 2420/905; B60W 2520/105; B60W 2520/125; B60W 2540/10; B60W 2540/106; B60W 2710/0666; B60W 2710/083; B60W 50/087
See application file for complete search history.

(56) References Cited

FOREIGN PATENT DOCUMENTS

| | | |
|---|---|---|
| WO | 201345153 A1 | 4/2013 |
| WO | 201807079 A1 | 1/2018 |

OTHER PUBLICATIONS

Mercedes-Benz of Salem, What is Mercedes-Benz Magic Body Control?, 2018, mercedesbenzofsalem.com, pp. 1 (Year: 2018).*

* cited by examiner

| 800 | | | | | | |
|---|---|---|---|---|---|---|
| Shock | 0 | 0.3 | 0.6 | 0.9 | 1.2 | 1.5 |
| Filter Length (ms) | 0 | 60 | 90 | 105 | 120 | 150 |
FIG. 8
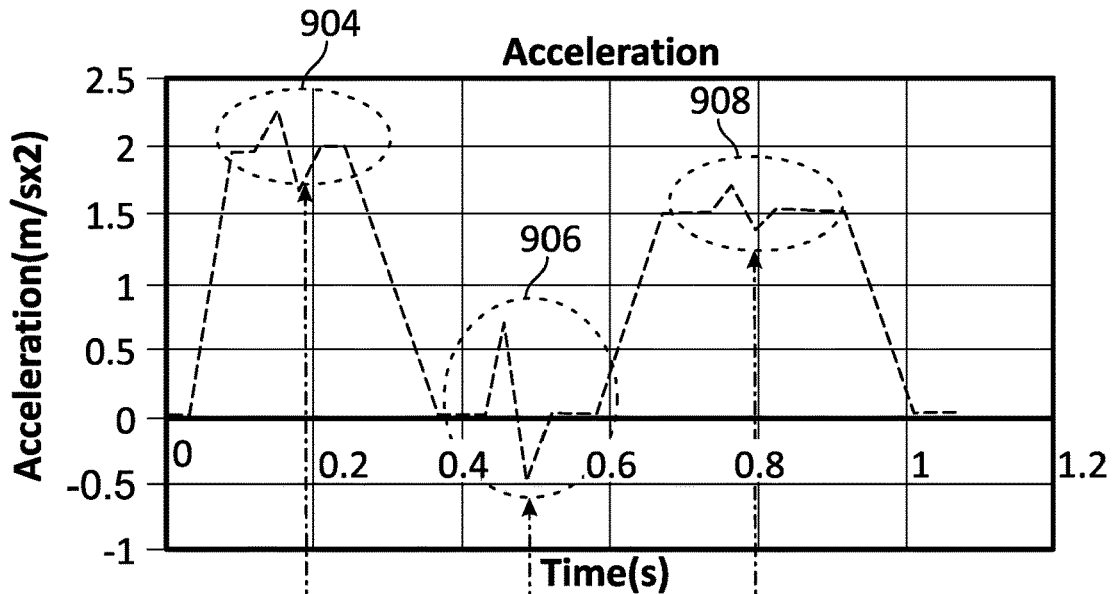
FIG. 9A
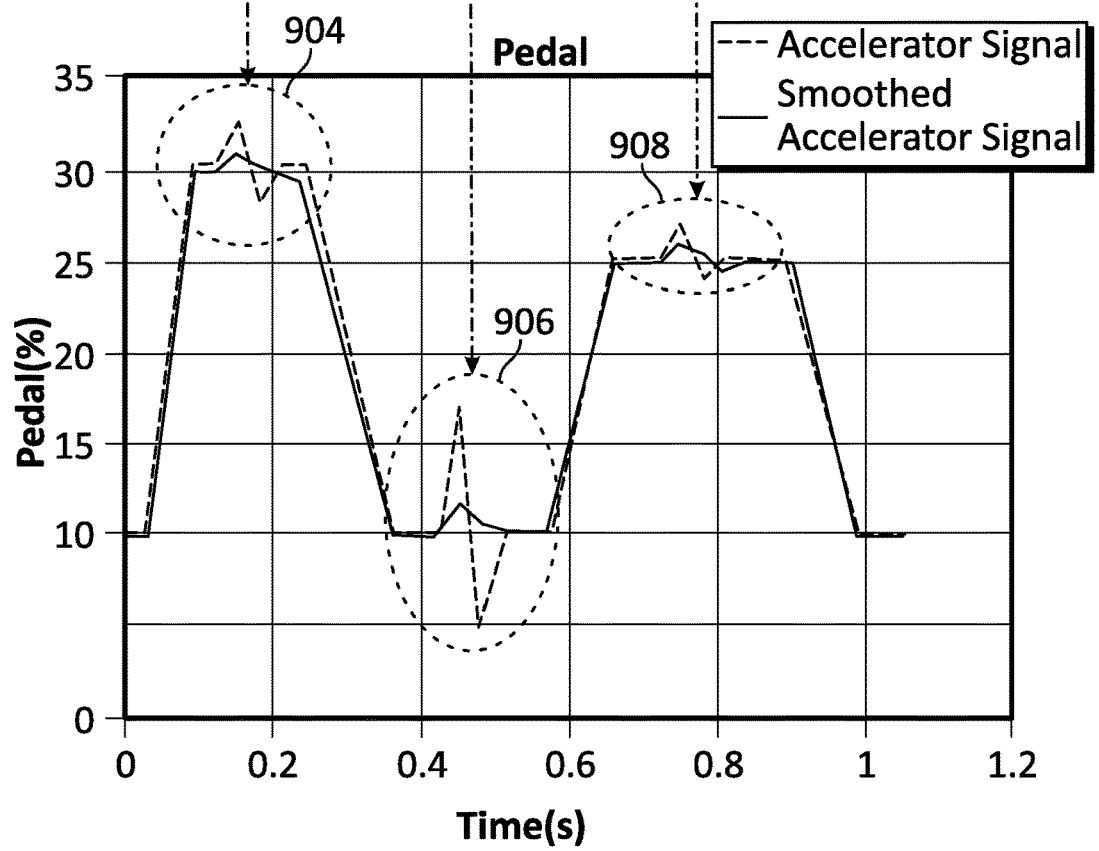
FIG. 9B

PEDAL SMOOTHING SYSTEMS AND METHODS

TECHNICAL FIELD

The present disclosure relates generally to vehicle systems, and, more particularly, to systems and methods for smoothing accelerator signal oscillations caused by road interference.

BACKGROUND

With hybrid or pure electric motor powertrains, engine start and stop functions are typically controlled by driver pedal input. Rough road conditions may cause the driver to oscillate the pedal, resulting in unintended starting or stopping of the engine and/or torque request oscillation (e.g., torque hunting) due to the pedal oscillation. Additionally, electric motor response may follow the pedal oscillation, causing additional longitudinal oscillation from the pedal input.

Therefore, a need exists in the art for systems and methods that address the above deficiencies, or at least offers an improvement, in the art. For example, a need exists for systems and methods that smooth accelerator signal oscillations caused by road interference.

BRIEF SUMMARY

Embodiments of the present disclosure are directed to systems and methods for applying pedal smoothing to avoid unnecessary torque request oscillation (e.g., torque hunting) caused by pedal oscillation. For example, systems and methods are provided to create a control to determine when outside road inputs are causing the driver to oscillate the pedal. When road interference is occurring, a filter (e.g., a pedal smoothing logic) is applied to limit torque request oscillation. When road interference is minimal or non-existent, the filter/logic is deactivated to maintain vehicle responsiveness for intended driver inputs.

Various embodiments of the present disclosure include a method of applying pedal smoothing logic based on shock magnitude. The method may include determining a shock value based on a vehicle acceleration, comparing the shock value to a first threshold value, and activating a pedal smoothing logic to smooth an accelerator signal based on the shock value being greater than the first threshold value.

Various embodiments of the present disclosure include a method of applying pedal smoothing logic based on detected road conditions and shock magnitude. The method may include identifying a rough road condition, determining a shock value based on a vehicle acceleration caused at least in part by the rough road condition, comparing the shock value to a first threshold value, and activating a pedal smoothing logic to smooth an accelerator signal based on the shock value being greater than the first threshold value and the rough road condition identified.

Various embodiments of the present disclosure include a system configured to apply pedal smoothing logic. The system may include an accelerometer configured to detect a vehicle acceleration, a pedal configured to provide an accelerator signal, and a logic device configured to perform operations, including identify a rough road condition, determine a shock value based on the vehicle acceleration caused at least in part by the rough road condition, compare the shock value to a first threshold value, and activate a pedal smoothing logic to smooth the accelerator signal based on the shock value being greater than the first threshold value and the rough road condition identified.

The scope of the invention is defined by the claims, which are incorporated into this section by reference. A more complete understanding of embodiments of the present invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

FIG. 8 is an illustration of determining a filter length, according to one or more embodiments of the disclosure.

FIGS. 9A-9B illustrate application of a pedal smoothing logic based on a moving average of pedal percentage for the duration of a determined filter length, according to one or more embodiments of the disclosure.

Figures 1, 2:
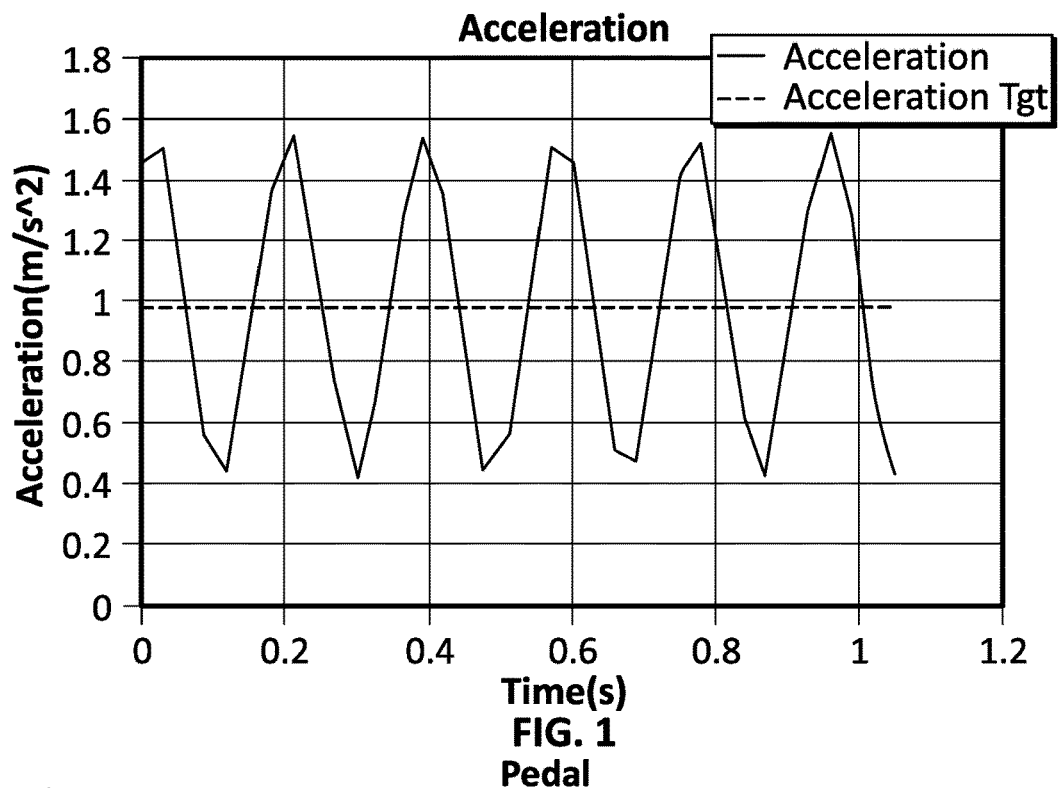
FIG. 1 is an illustration of road input causing a vehicle acceleration, such as vibration or oscillation.
FIG. 2 is an illustration of road input causing pedal modulation by a driver.

Embodiments of the present disclosure and their advantages are best understood by referring to the detailed description that follows. It is noted that sizes of various components and distances between these components are not drawn to scale in the figures. It should be appreciated that like reference numerals are used to identify like elements illustrated in one or more of the figures.

DETAILED DESCRIPTION

Embodiments of the present disclosure are directed to systems and methods for applying pedal smoothing to avoid unnecessary torque request oscillation (e.g., torque hunting) caused by pedal oscillation. Road input may cause the acceleration of a vehicle to oscillate. As a result, the driver of the vehicle may intentionally or unintentionally cause their foot to oscillate corresponding to the oscillation of the vehicle acceleration. In internal combustion engine vehicles, the engine delay may naturally provide smoothing of the driver's pedal oscillation to limit sudden changes in vehicle acceleration. However, electric motors lack such engine delay, and thus the driver's pedal oscillation is reflected in the vehicle's torque.

To create a smoothing effect for electric motors, a system may monitor a forward-looking camera/sensor for rough terrain (e.g., potholes) and activate a pedal smoothing logic based on detecting rough terrain. The pedal smoothing logic may include continually monitoring an accelerometer for vehicle acceleration (e.g., in 3-dimensions). To identify rough road conditions, the vehicle (e.g., a control system of the vehicle) may determine a shock value from peak to trough of an acceleration change. Pedal smoothing logic may be activated based on the forward-looking camera/sensor detecting rough terrain and the shock value being greater than a first threshold. Alternatively, pedal smoothing logic may be activated based on the shock value being greater than a second threshold, which is greater than the first threshold. Once the pedal smoothing logic is activated, pedal smoothing may remain active until the shock value is less than a third threshold, which is less than the first threshold, at which point the pedal smoothing logic is deactivated.

In determining whether to apply the pedal smoothing logic, the system may use the highest shock value over a set interval, referencing a table of shock values to identify a filter length. The pedal smoothing logic may be applied based on a moving average of pedal percentage for the duration of the identified filter length.

Figure 3:
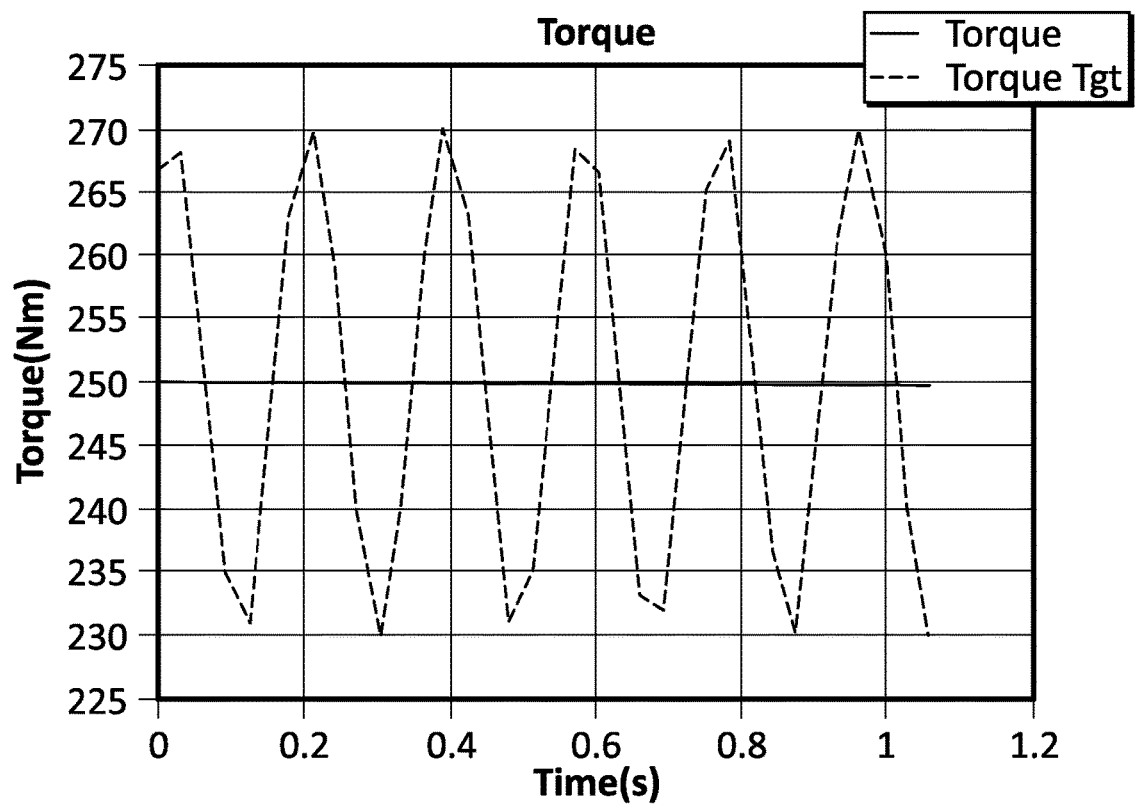
FIG. 3 is an illustration of road input causing an oscillating vehicle torque mirroring the pedal modulation by the driver.

FIGS. 1-3 illustrate how road input can impact a pedal position and a resulting vehicle torque. As illustrated in FIG. 1, road input may cause a vehicle to vibrate/oscillate, such as from vehicle contact with road joints, bumps, debris, or damage (e.g., a pothole, a crack, or other road damage), for example. As shown, the road input may cause the vehicle to vibrate or oscillate at a given frequency. As illustrated in FIG. 2, road input may cause the driver to modulate their foot with the vehicle vibration/oscillation. For example, the driver may intentionally or unintentionally cause their foot to oscillate corresponding to the oscillation of the vehicle acceleration. As illustrated in FIG. 3, driver foot oscillation may create an oscillating torque request (e.g., via an accelerator signal) mirroring the driver input. In internal combustion engine vehicles, the engine delay may naturally provide a smoothing of the driver's pedal oscillation to limit sudden changes in vehicle acceleration. However, electric motors may lack such engine delay, and in such embodiments, the driver's pedal oscillation is reflected in the vehicle's torque, which may cause unnecessary torque hunting (e.g., unnecessary requests of engine output torque).

Figure 4:
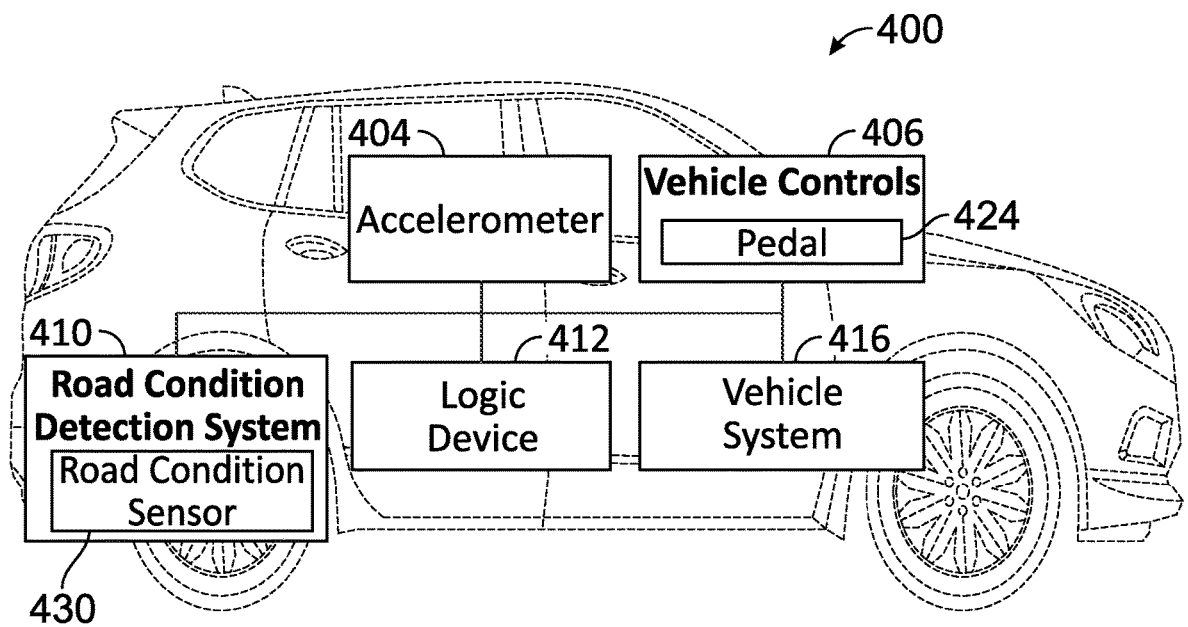
FIG. 4 is a diagram of various systems of a vehicle, according to one or more embodiments of the disclosure.

FIG. 4 is a diagram of various systems of a vehicle 400, according to one or more embodiments of the disclosure. Referring to FIG. 4, vehicle 400 may include one or more features or components configured to apply pedal smoothing to avoid the unnecessary torque hunting caused by pedal oscillation. For example, vehicle 400 may include an accelerometer 404, vehicle controls 406, a road condition detection system 410, a logic device 412, and other vehicle systems 416. Vehicle 400 may be a road vehicle, an off-road vehicle, an aerial vehicle, or other vehicle type.

Accelerometer 404 may be implemented as one or more electronic sextants, semiconductor devices, integrated chips, accelerometer sensors, accelerometer sensor systems, or other devices capable of measuring angular velocities/accelerations and/or linear accelerations (e.g., direction and magnitude) of vehicle 400 (or components thereof) and providing such measurements as sensor signals and/or data that may be communicated to other devices of vehicle 400 (e.g., logic device 412, vehicle systems 416, etc.). Accelerometer 404 may be a multi-axis accelerometer configured to detect both the magnitude and the direction of acceleration in 3-dimensions. Accelerometer 404 may be used to sense orientation, coordinate acceleration, vibration, and shock of vehicle 400 and/or components thereof.

Vehicle controls 406 may include one or more devices for controlling vehicle 400. For example, vehicle controls 406 may include a pedal 424 (e.g., an accelerator pedal, a brake pedal), a steering wheel, a joystick, etc. Vehicle controls 406 may be manipulated by the driver to control vehicle operation (e.g., speed, direction, acceleration, etc.). In embodiments, a vehicle control may be configured to provide a control signal to a controller (e.g., logic device 412) based on driver input. For example, pedal 424 may be configured to provide an accelerator signal to logic device 412, the accelerator signal corresponding to a torque request from the driver as indicated by pedal position.

Road condition detection system 410 may be configured to sense a road condition during vehicle operation. For example, road condition detection system 410 may be configured to detect, via a road condition sensor 430, a rough road element, such as a pothole, crack, or other road damage or disturbance, by scanning the road in the direction of travel. Road condition sensor 430 may include a camera (e.g., a forward-looking camera), laser, radar, sensor, or any combination thereof for detecting a rough road condition along a travel path. Road condition detection system 410 may monitor the travel path for identifiable rough road conditions Logic device 412 may be any controller, processor, module, circuitry, or device configured to perform one or more operations. Logic device 412 may be implemented as any appropriate controller (e.g., processing device, microcontroller, electronic control unit, processor, application specific integrated circuit (ASIC), field programmable gate array (FPGA), memory storage device, memory reader, or other device or combinations of devices) that may be adapted to execute, store, and/or receive appropriate instructions, such as software instructions for controlling various operations of accelerometer 404, vehicle controls 406, road condition detection system 410, vehicle systems 416, and/or other elements of vehicle 400, for example. Such software instructions may also implement methods for processing images and/or other sensor signals or data, determining sensor information, providing user feedback (e.g., through a user interface), querying devices for operational parameters, selecting operational parameters for devices, or performing any of the various operations described herein (e.g., operations performed by logic devices of various devices of vehicle 400).

Logic device 412 may be communicatively connected to accelerometer 404, vehicle controls 406, road condition detection system 410 (e.g., road condition sensor 430), and vehicle systems 416. Logic device 412 may be configured to receive data from at least one sensor of vehicle 400. For example, logic device 412 may receive data or other sensor signals from accelerometer 404, vehicle controls 406, road condition sensor 430, and vehicle systems 416, or any combination thereof. In embodiments, logic device 412 may receive data from a map, a traffic service, or a network, among other external sources identifying the type and location of one or more rough road elements. Depending on the application, logic device 412 may receive and transmit data over wired or wireless communication.

Based on data received, logic device 412 may be configured to determine a rough road condition. For instance, logic device 412 may determine that one or more rough road elements exist based on data received from road condition sensor 430 monitoring the travel path of vehicle 400. Logic device 412 may monitor the travel path of vehicle 400 by continuously or near-continuously analyzing data received from road condition sensor 430. In embodiments, logic device 412 may intelligently determine the presence of a rough road element based upon on one or more factors. For example, logic device 412 may apply one or more machine learning algorithms in determining the type and severity of a rough road condition. As a result, the detection system may include one or more smart features to adapt the system where appropriate.

With continued reference to FIG. 4, vehicle 400 may include other components or systems. For example, vehicle systems 416 may include any combination of a propulsion system (e.g., engine and drivetrain), a suspension system, a GPS system, a vehicle dynamics system, control units, sensors, interfaces, an audio system, a display system, a communications system, and/or a user interface system, among others, of vehicle 400.

Figure 5:
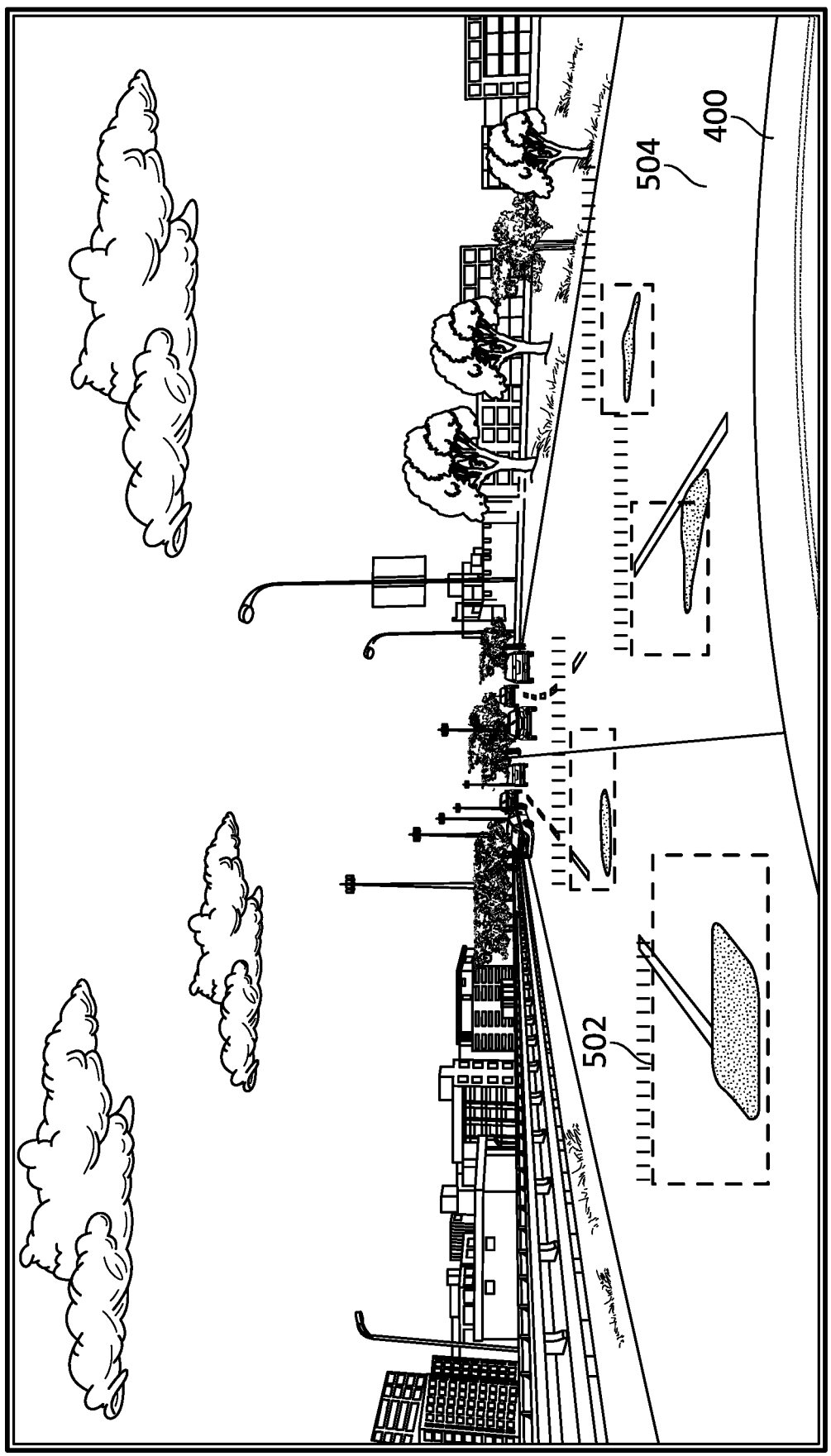
FIG. 5 is an illustration of identifying one or more rough road elements using a forward-looking camera, according to one or more embodiments of the disclosure.

FIG. 5 is an illustration of identifying one or more rough road elements using road condition detection system 410, such as road condition sensor 430 (e.g., a forward-looking camera), according to one or more embodiments of the disclosure. As illustrated, road condition detection system 410 may scan the travel path of vehicle 400 to identify one or more rough road elements 502 on a roadway 504. For example, road condition sensor 430 may be forward-looking to identify rough road elements 502 in front of vehicle 400, although other configurations are contemplated. As shown, road condition sensor 430 may capture an image of upcoming road conditions. One or more filters may be applied to the captured image to identify rough road elements 502. For instance, the system may analyze the captured image to detect potholes, road cracks, or other road damage having a potential of causing vehicle oscillation, and consequently pedal oscillation. As detailed below, identification of upcoming rough road conditions may precondition the system to apply a pedal smoothing logic, such as to smooth an accelerator signal.

Figure 6:
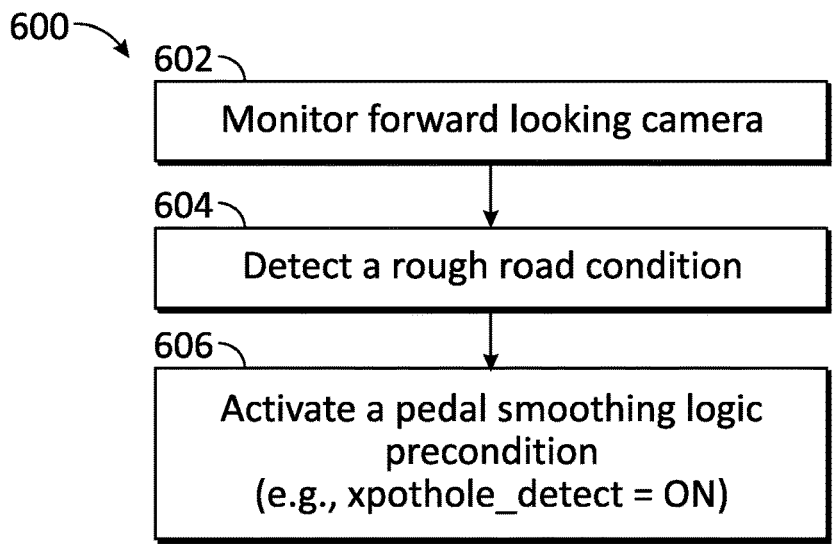
FIG. 6 is a flowchart of a method of activating a pedal smoothing logic precondition, according to one or more embodiments of the disclosure.

FIG. 6 is a flowchart of a method 600 of activating a pedal smoothing logic precondition, according to one or more embodiments of the disclosure. For explanatory purposes, method 600 is described with reference to FIGS. 1-5. Note that one or more operations in FIG. 6 may be combined, omitted, and/or performed in a different order as desired. According to various embodiments, method 600 may be performed by a logic device, such as a logic device of road condition detection system 410, logic device 412 of vehicle 400, or a combination of the aforementioned logic devices, which may be communicatively coupled to execute the operations of method 600.

Method 600 may be applied to precondition the system to apply a pedal smoothing logic, such as to smooth an accelerator signal. In block 602, method 600 includes monitoring road condition sensor 430, such as a forward-looking camera. For instance, road condition sensor 430 may be monitored continuously, near-continuously, or periodically by road condition detection system 410 and/or logic device 412. In block 604, method 600 includes detecting a rough road condition. For example, a rough road element 502 may be detected based on the monitoring of road condition sensor 430, as described above. In block 606, method 600 includes activating a pedal smoothing logic precondition (e.g., xpothole_detect=ON) based on the detected rough road condition.

Figure 7:
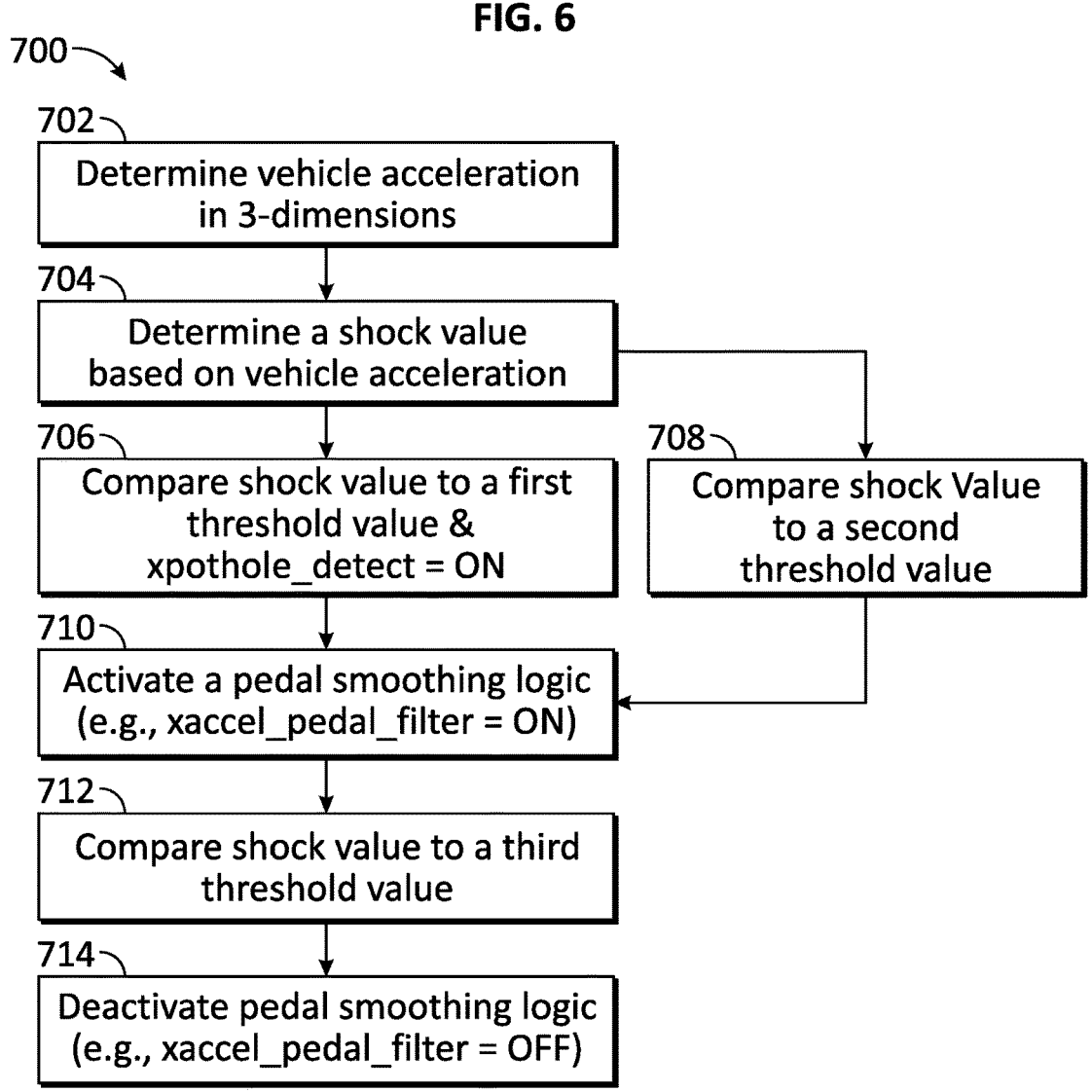
FIG. 7 is a flowchart of a method of activating and deactivating a pedal smoothing logic, according to one or more embodiments of the disclosure.

FIG. 7 is a flowchart of a method 700 of activating and deactivating a pedal smoothing logic, according to one or more embodiments of the disclosure. For explanatory purposes, method 700 is described with reference to FIGS. 1-6. Note that one or more operations in FIG. 7 may be combined, omitted, and/or performed in a different order as desired. According to various embodiments, method 700 may be performed by a logic device, such as a logic device of road condition detection system 410, logic device 412 of vehicle 400, or a combination of the aforementioned logic devices, which may be communicatively coupled to execute the operations of method 700.

In block 702, method 700 includes determining the vehicle acceleration in 3-dimensions. For example, accelerometer 404 may be monitored to detect accelerations along the x, y, and z axes. In embodiments, block 702 may include continually or near-continually monitoring x, y, and z accelerations.

In block 704, method 700 includes determining a shock magnitude or value based on the vehicle acceleration, such as in response to a rough road condition, such as the rough road condition identified in block 604 of method 600, described above. For example, shock values may be continuously determined on a running basis during vehicle operation. In embodiments, block 704 may include calculating a peak-to-trough delta acceleration to judge the degree of road shock, as explained below. For example, the peak-to-trough delta acceleration may be used to determine a shock magnitude resulting from rough road conditions.

In block 706, method 700 may include comparing a determined shock value to a first threshold value when a pedal smoothing logic precondition is activated. The pedal smoothing logic precondition may be activated in block 606 of method 600, explained above. The first threshold value may be minimum shock value at which there is a likelihood that pedal oscillation may occur due to rough road conditions. As explained below, the first threshold value may be a minimum shock value requiring further verification that rough road conditions exist (e.g., via road condition sensor 430, via method 600, etc.) to avoid a false positive determination of rough road conditions.

In block 708, method 700 may include comparing a determined shock value to a second threshold value. The second threshold value may be greater than the first threshold value. The second threshold value may represent a shock value at which pedal oscillation is expected to occur due to vehicle oscillation (e.g., from rough road conditions). For example, shock values exceeding the second threshold value may almost certainly guarantee pedal oscillation necessitating pedal smoothing. If block 708 determines a shock value is greater than the second threshold value, method 700 may proceed to block 710.

In block 710, method 700 includes activating a pedal smoothing logic (e.g., xaccel_pedal_filter=ON) to smooth an accelerator signal. For example, pedal smoothing logic may be activated based on a determined shock value being greater than the first threshold value and a pedal smoothing logic precondition activated (as determined in block 706). Alternatively, pedal smoothing logic may be activated based on a determined shock value being greater than the second threshold value (as determined in block 708). Because the second threshold value is greater than the first threshold value, the pedal smoothing logic may be activated should the shock value exceed the second threshold value and regardless of whether a rough road condition is pre-identified (e.g., regardless of whether pedal smoothing logic precondition is activated in block 606).

In block 712, method 700 includes comparing a determined shock value to a third threshold value. The third threshold value may be less than the first threshold value. The third threshold value may represent a shock value at which pedal oscillation is a non-issue or expected to be a non-issue. For example, shock values less than the third threshold value may almost certainly guarantee pedal smoothing is not needed. If block 712 determines a shock value is less than the third threshold value, method 700 may proceed to block 714.

In block 714, method 700 includes deactivating the pedal smoothing logic (e.g., xaccel_pedal_filter=OFF). For example, the pedal smoothing logic may be deactivated based on a determined shock value being less than the third threshold value. In this manner, pedal smoothing logic may be active while road interference is occurring to limit torque request oscillation, but deactivated while road interference is not occurring to maintain vehicle responsiveness for intended driver inputs.

FIG. 8 is an illustration of determining a filter length, according to one or more embodiments of the disclosure. To apply pedal smoothing, road condition detection system 410 may determine a shock magnitude from the accelerometer 404 and use the highest shock value over a predetermined or calibrated interval to determine a filter length. For example, the highest peak-to-trough delta acceleration value over a 0.25 s interval (or other calibrated value) may be determined. A 1-dimensional map may be used to look up a moving average filter length. For instance, road condition detection system 410 may reference a shock value table 800 to identify the moving average filter length. For example, as illustrated in FIG. 8, a shock value of 0.3 m/s2 or greater may indicate a filter length of 60 ms, a shock value of 0.6 m/s2 or greater may indicate a filter length of 90 ms, a shock value of 0.9 m/s2 or greater may indicate a filter length of 105 ms, a shock value of 1.2 m/s2 or greater may indicate a filter length of 120 ms, a shock value of 1.5 m/s2 or greater may indicate a filter length of 150 ms, and so on.

FIGS. 9A-9B illustrate application of a pedal smoothing logic based on a moving average of pedal percentage for the duration of a determined filter length, according to one or more embodiments of the disclosure. FIG. 9A illustrates acceleration of vehicle 400 over time. FIG. 9B illustrates pedal position, and the associated accelerator signal, over time, with pedal oscillations corresponding to the acceleration oscillations of FIG. 9A. As illustrated in FIG. 9A, a first chassis shock 904, a second chassis shock 906, and a third chassis shock 908 may be identified from the accelerometer 404.

As illustrated in FIG. 9B, first chassis shock 904 may be a mid shock (e.g., as determined by first chassis shock 904 having an intermediate shock magnitude), second chassis shock 906 may be a high shock (e.g., as determined by second chassis shock 906 having a high shock magnitude), third chassis shock 908 may be a low shock (e.g., as determined by third chassis shock 908 having a low shock magnitude). Referencing shock value table 800 of FIG. 8, the shock magnitude of first chassis shock 904 may indicate a 90 ms moving average filter length, the shock magnitude of second chassis shock 906 may indicate a 120 ms moving average filter length, and the shock magnitude of third chassis shock 908 may indicate a 60 ms moving average filter length.

With continued reference to FIG. 9B, pedal smoothing logic may be applied to the accelerator signal over the identified filter lengths to smooth out the accelerator signal during the chassis shocks. For example, pedal smoothing logic may be applied for 90 ms at first chassis shock 904, for 120 ms at second chassis shock 906, and for 60 ms at third chassis shock 908. As illustrated, application of the pedal smoothing logic may result in a smoothed accelerator signal.

Figure 10:
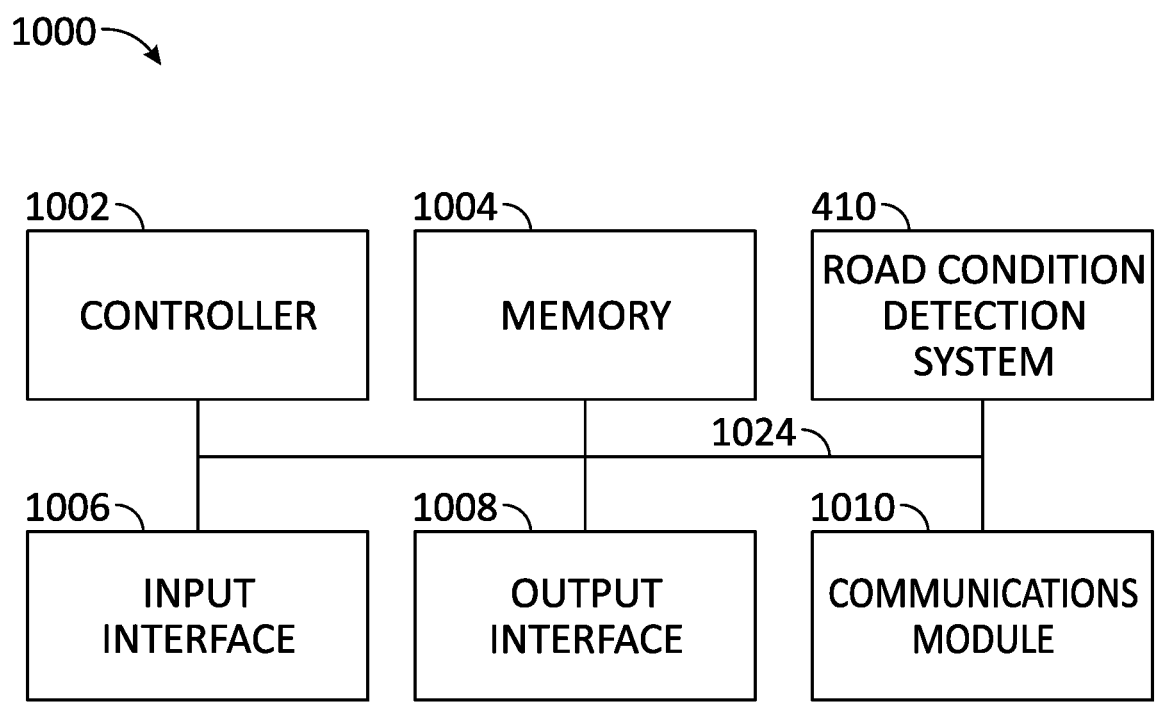
FIG. 10 is a diagram illustrating an example computing or processing system, according to one or more embodiments of the disclosure.

FIG. 10 is a diagram illustrating an example computing or processing system 1000 in which embodiments of the present disclosure may be implemented, according to one or more embodiments of the disclosure. For example, system 400 of FIG. 4, described above, may be implemented using system 1000. In some embodiments, method 600 of FIG. 6 and/or method 700 of FIG. 7, described above, may be implemented using system 1000. System 1000 can be or include a computer, phone, PDA, tablet, server, controller, or any other type of electronic device. Such an electronic device includes various types of computer readable media and interfaces for various other types of computer readable media. As shown in FIG. 10, system 1000 includes a controller 1002, a memory 1004, an input interface 1006, an output interface 1008, a communications module 1010, and road condition detection system 410.

Controller 1002, according to various embodiments, includes one or more of a processor, a microprocessor, a central processing unit (CPU), an electronic control unit, a graphics processing unit (GPU), a single-core processor, a multi-core processor, a microcontroller, a programmable logic device (PLD) (e.g., field programmable gate array (FPGA)), an application specific integrated circuit (ASIC), a digital signal processing (DSP) device, or other logic device that may be configured, by hardwiring, executing software instructions, or a combination of both, to perform various operations discussed herein for embodiments of the disclosure. Controller 1002 may be configured to interface and communicate with the various other components of system 1000 to perform such operations. For example, controller 1002 may be configured to receive and process map, position, distraction, facial monitoring, and vehicle dynamics data, among others, received from a network and/or one or more sensors (e.g., road condition sensor 430, accelerometer 404, etc.), store the data in memory 1004, and/or retrieve stored data from memory 1004.

Controller 1002 may include combinations of hardware and software processing functionality and may be provided with/in and/or communicatively attached to other components to execute appropriate instructions, such as software instructions and/or processing parameters stored in memory 1004. In various embodiments, controller 1002 may be configured to execute software instructions stored in memory 1004 to perform various methods, processes, or operations in the manner described herein.

Memory 1004 includes, in one embodiment, one or more memory devices configured to store data and information, including magnetic flux data and position information. The memory 1004 may include one or more various types of memory devices including volatile and non-volatile memory devices, such as random-access memory (RAM), dynamic RAM (DRAM), static RAM (SRAM), non-volatile random-access memory (NVRAM), read-only memory (ROM), programmable read-only memory (PROM), erasable programmable read-only memory (EPROM), electrically-erasable programmable read-only memory (EEPROM), flash memory, hard disk drive, and/or other types of memory. As discussed above, controller 1002 may be configured to execute software instructions stored in memory 1004 to perform method 600 and/or method 700 and process steps and/or operations. Controller 1002 may be configured to store data in memory 1004.

Input interface 1006 includes, in one embodiment, a user input and/or an interface device, such as one or more controls, knobs, buttons, slide bars, keyboards, sensors, cameras, and/or other devices, that are adapted to generate an input control signal. Controller 1002 may be configured to sense the input control signals from input interface 1006 and respond to any sensed input control signals received therefrom. Controller 1002 may be configured to interpret such an input control signal as a value, as generally understood by one skilled in the art. In one embodiment, input interface 1006 may include a control unit (e.g., a wired or wireless handheld control unit) having push buttons adapted to interface with a user and receive user input control values. In one implementation, the push buttons of the control unit may be used to control various system functions.

Output interface 1008 may enable, for example, the output of data or other information. Output interface 1008 may include, for example, one or more display devices, such as monitors or other visual displays (e.g., light emitting diode (LED) displays, liquid crystal displays (LCDs), head-up displays (HUDs), or other types of displays). Some implementations include devices such as a touchscreen that function as both input and output components. Controller 1002 may be configured to render data and information on output interface 1008. For example, controller 1002 may be configured to render data on output interface 1008, such as data stored in memory 1004.

In some embodiments, various components of system 1000 may be distributed and in communication with one another over a network. In this regard, communications module 1010 may be configured to facilitate wired and/or wireless communication among various system components over the network. Such a network may include, for example, a local area network ("LAN"), such as an Intranet, or a wide area network ("WAN"), such as the Internet.

In embodiments, various components of system 1000 may be communicatively connected via a system communications bus 1024. Bus 1024 collectively represents all system, peripheral, and chipset buses that communicatively connect the numerous devices of system 1000. For instance, bus 1024 may communicatively connect controller 1002, memory 1004, input interface 1006, output interface 1008, communications module 1010, and road condition detection system 410, or any combination thereof, together.

Where applicable, various embodiments provided by the present disclosure can be implemented using hardware, software, or combinations of hardware and software. Also, where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine-readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

While certain exemplary embodiments of the invention have been described and shown in the accompanying drawings, it is to be understood that such embodiments are merely illustrative of and not restrictive on the broad invention, and that the embodiments of the invention not be limited to the specific constructions and arrangements shown and described, since various other modifications may occur to those ordinarily skilled in the art. The intention is to cover all modifications, equivalents and alternatives falling within the spirit and scope of the disclosure as defined by the claims.

For example, the elements and teachings of the various embodiments may be combined in whole or in part in some or all of the embodiments. In addition, one or more of the elements and teachings of the various embodiments may be omitted, at least in part, and/or combined, at least in part, with one or more of the other elements and teachings of the various embodiments. In addition, while different steps, processes, and procedures are described as appearing as distinct acts, one or more of the steps, one or more of the processes, and/or one or more of the procedures may also be performed in different orders, simultaneously, and/or sequentially. In some embodiments, the steps, processes, and/or procedures may be merged into one or more steps, processes, and/or procedures. In some embodiments, one or more of the operational steps in each embodiment may be omitted.

What is claimed is:

1. A method comprising:
    scanning a travel path of a vehicle using a forward-looking camera;
    analyzing image data of the forward-looking camera to detect a rough road condition;
    determining a shock value based on a vehicle acceleration;
    comparing the shock value to a first threshold value; and
    in response to detection of the rough road condition using the image data and the shock value being greater than the first threshold value, activating a pedal smoothing logic to smooth an accelerator signal.

2. The method of claim 1, further comprising:
    determining a second shock value based on the vehicle acceleration in response to the detected rough road condition;
    comparing the second shock value to a second threshold value, the second threshold value being less than the first threshold value; and
    activating the pedal smoothing logic based on the second shock value being greater than the second threshold value.

3. The method of claim 2, further comprising:
    determining a third shock value based on the vehicle acceleration;
    comparing the third shock value to a third threshold value, the third threshold value being less than the second threshold value; and
    deactivating the pedal smoothing logic based on the third shock value being less than the third threshold value.

4. The method of claim 1, further comprising determining the vehicle acceleration in 3-dimensions.

5. The method of claim 1, wherein the determining the shock value comprises calculating a peak-to-trough delta acceleration.

6. The method of claim 1, further comprising applying a moving average of pedal percentage for a time period based on the shock value.

7. A system comprising:
    an accelerometer configured to detect the vehicle acceleration;
    a pedal configured to provide the accelerator signal; and
    a logic device configured to perform operations comprising the method of claim 1.

8. A method comprising:
identifying a rough road condition by:
  scanning a travel path of a vehicle using a forward-looking camera;
  analyzing image data of the forward-looking camera to identify the rough road condition;
determining a shock value based on a vehicle acceleration caused at least in part by the rough road condition;
comparing the shock value to a first threshold value; and
in response to identification of the rough road condition using the image data and the shock value being greater than the first threshold value, activating a pedal smoothing logic to smooth an accelerator signal.

9. The method of claim 8, further comprising:
determining a second shock value based on the vehicle acceleration;
comparing the second shock value to a second threshold value, the second threshold value being greater than the first threshold value; and
activating the pedal smoothing logic based on the second shock value being greater than the second threshold value.

10. The method of claim 8, further comprising:
determining a second shock value based on the vehicle acceleration;
comparing the second shock value to a second threshold value, the second threshold value being less than the first threshold value; and
deactivating the pedal smoothing logic based on the second shock value being less than the second threshold value.

11. The method of claim 8, further comprising determining the vehicle acceleration in 3-dimensions.

12. The method of claim 8, wherein the determining the shock value comprises calculating a peak-to-trough delta acceleration.

13. The method of claim 8, further comprising applying a moving average of pedal percentage for a time period based on the shock value.

14. A system comprising:
an accelerometer configured to detect the vehicle acceleration;
a pedal configured to provide the accelerator signal; and
a logic device configured to perform operations comprising the method of claim 8.

15. A system comprising:
an accelerometer configured to detect a vehicle acceleration;
a pedal configured to provide an accelerator signal; and
a logic device configured to perform operations comprising:
  identify a rough road condition by:
    scanning a travel path of a vehicle using a forward-looking camera;
    analyzing image data of the forward-looking camera to identify the rough road condition,
  determine a shock value based on the vehicle acceleration caused at least in part by the rough road condition,
  compare the shock value to a first threshold value, and
  in response to identification of the rough road condition using the image data and the shock value being greater than the first threshold value, activate a pedal smoothing logic to smooth the accelerator signal.

16. The system of claim 15, wherein the logic device is configured to:
determine a second shock value based on the vehicle acceleration;
compare the second shock value to a second threshold value, the second threshold value being greater than the first threshold value; and
activate the pedal smoothing logic based on the second shock value being greater than the second threshold value.

17. The system of claim 15, wherein the logic device is configured to:
determine a second shock value based on the vehicle acceleration;
compare the second shock value to a second threshold value, the second threshold value being less than the first threshold value; and
deactivate the pedal smoothing logic based on the second shock value being less than the second threshold value.

* * * * *